June 16, 1936. D. J. COLLINS 2,044,667

LOCK NUT

Filed Feb. 13, 1935

Inventor
David John Collins
By B Linger, atty.

Patented June 16, 1936

2,044,667

UNITED STATES PATENT OFFICE 2,044,667

LOCK NUT

David John Collins, Collinsville, Bowen Coalfield, Queensland, Australia

Application February 13, 1935, Serial No. 6,358
In Australia July 31, 1934

2 Claims. (Cl. 151—12)

The object of this invention is to provide a nut for a bolt, stud or other like screw-threaded element, which may be screwed on to the bolt or the like in the usual way, but is restrained against slacking back owing to vibration or other untoward influences, and yet is capable of being unscrewed and removed as occasion may require.

With the above-stated object the invention consists in a nut for use on a threaded element formed with one or more longitudinal grooves or notches on its threaded surface, said nut being formed with a slot parallel with the bottom face of the nut and meeting the bore, and including a ratchet-pawl pivoted in said recess and at one end formed as a tooth to engage any one of said grooves or notches on the threaded element, a spring urging the pawl into such engagement to prevent the nut from slacking back, and means incorporated in and constituting part of the nut for moving the pawl to and retaining it in disengaging position to permit the nut to be unscrewed. The tooth of the pawl is preferably shaped to constitute threads adapted to register with those on the bolt, so that the tips of the later will not be injured as the nut is screwed up, nor the ends of the threads burred.

The invention may be embodied in different forms, and for the purpose of more fully explaining it, reference is made to the accompanying drawing which depicts two practical embodiments each a modification of the other.

Figure 5:
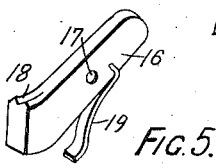
Figure 5 is a perspective view of the pawl and spring.

The nut 12 is of conventional shape and is adapted to screw on to a bolt 13 which has a plurality of longitudinal grooves or notches 14, 14 on its threaded portion. In the nut is cut a slot 15 of sufficient depth to meet the bore of the nut and in the recess is a ratchet-pawl 16 pivotally mounted on a pin 17 fitted in a hole bored perpendicularly from the top or bottom face of the nut. The pawl is formed with a tooth 18 which, as clearly shown in Figure 5, is serrated or threaded to register with the threads on the bolt, this formation rendering it necessary that the notches 14 on the bolt are deeper than the threads thereon, in order to provide an abutment surface below the roots of the threads.

The tooth of the pawl is urged towards the bolt by a bow-spring 19 anchored at one end in a kerf 20 in the pawl, and bearing at its other end against an abutment.

Figure 1:
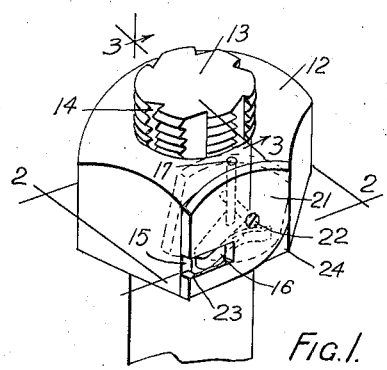
Figure 1 is a perspective view showing a bolt and nut embodying the invention in one form.
Figure 2:
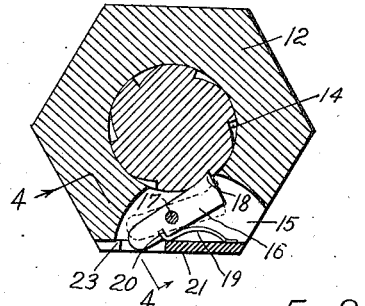
Figure 2 is a sectional plan on plane 2, 2 of Figure 1.
Figure 3:
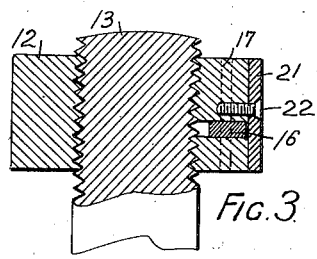
Figure 3 is a sectional elevation.
Figure 4:
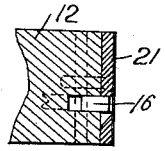
Figure 4 is a sectional elevation on line 4, 4 of Figure 2.

In the construction shown in Figures 1 to 4 inclusive, the spring abuts against a cover plate 21 rotatable on a pivot screw 22 and formed with a slot 23 normally in register with the slot in the nut, said plate being rounded off at the lower right-hand corner as at 24 to permit it to be swung clockwise on its pivot when the base of the nut is bearing against a surface. The pawl is so formed and arranged that when the nut is screwed on a bolt and the operative end of the pawl engages one of the notches of the bolt, the tail of the pawl projects into the slot 23 of the plate when the latter is in normal position as shown in Figure 1; but when the plate is rotated in clockwise direction the end of slot 23 acts as a cam to inwardly move the tail end of pawl 16 and withdraw the tooth 18 from engagement with the notch 14 of the bolt 13 so that the nut 12 may be slacked back. The arrangement of the plate 21 in relation to the nut is such that the outer surface of the plate constitutes one of the flats of the nut.

Figure 6:
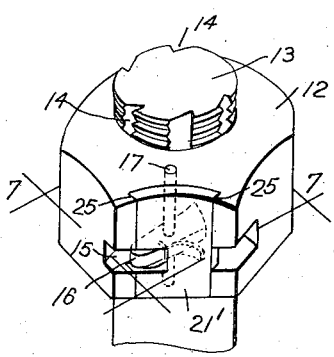
Figure 6 is a perspective view showing a modified construction of nut on a bolt, Figure 7 a sectional plan on plane 7, 7 of Figure 6, and Figure 8 a part sectional elevation on line 8, 8 of Figure 7.
Figure 7:
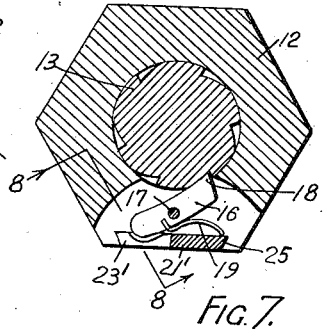
Figure 8:
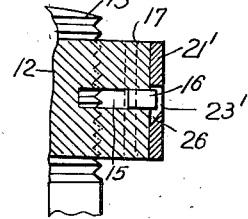

In the modification shown in Figures 6, 7 and 8, the cover plate 21[1] is slidably mounted in bevelled guides 25, 25 cut in that side of the nut in which the slot or kerf is cut, and is movable vertically. When the plate 21[1] is in the position shown in Figure 8 its slot 23[1] is in register with the tail of the pawl 17 and the tooth 18 of the latter is in engagement with the bolt under the influence of spring 19. To release the nut the plate 21[1] is raised and the bevelled edge 26 (Figure 8) of its slot 23 acts as a cam to push inwardly the tail of the pawl and retract the tooth. The plate is retained in raised position by frictional contact of the pawl against its inner face until the nut is removed from the bolt. After screwing the nut on the bolt, the plate is adjusted to normal position as shown in Figure 8.

I claim:

1. A lock nut for use on a bolt or the like having longitudinal ratchet grooves or notches on its threaded surface; said nut being in the form of a regular polygon in plan view and having a radial slot extending from its periphery to its bore, a ratchet-pawl pivotally mounted in said slot and wholly located at all times within the confines of the nut, a spring urging the operative end of said pawl into the bore of the nut to engage one of the said grooves in the bolt, a plate carried by the nut, the outer faces of the plate constituting parts of the regular peripheral contour of the nut, means to mount the plate within the compass of the nut for movement in its own plane over said radial slot, said plate having a slotted portion with a cam part registering with said slot in the nut into which the tail end of said pawl projects, said plate when moved in its plane from its normal or inoperative position serving to retract the operative end of said pawl and close the end of said slot in the nut in which the pawl is located thereby holding the pawl inoperative by contact of the pawl with the inner face of said plate.

2. A lock nut for use on a bolt or the like having longitudinal ratchet grooves or notches on its threaded surface; said nut being in the form of a regular polygon in plan view and having a radial slot extending from its periphery to its bore, a ratchet-pawl pivotally mounted in said slot and wholly located at all times within the confines of the nut, a spring urging the operative end of said pawl into the bore of the nut to engage one of the said grooves in the bolt, a plate carried by the nut, the outer faces of the plate constituting parts of the regular peripheral contour of the nut, means to mount the plate within the compass of the nut for movement in its own plane over said radial slot, said plate having a slotted portion with a cam part registering with said slot in the nut into which the tail end of said pawl projects, said plate when moved in its plane from its normal or inoperative position serving to retract the operative end of said pawl and close the end of said slot in the nut in which the pawl is located thereby holding the pawl inoperative by contact of the pawl with the inner face of said plate, said spring being carried by said pawl and continuously engaging said slidable plate to maintain the spring tension.

DAVID JOHN COLLINS.